US009009653B2

(12) United States Patent
Padmalata et al.

(10) Patent No.: US 9,009,653 B2
(45) Date of Patent: Apr. 14, 2015

(54) IDENTIFYING QUALITY REQUIREMENTS OF A SOFTWARE PRODUCT

(71) Applicant: Tata Consultancy Services Limited, Mumbai (IN)

(72) Inventors: Nistala Venkata Padmalata, Hyderabad (IN); Ravi Shankar Pillutla, Hyderabad (IN); Vijay Lakshmi Srinivas Kraleti, Hyderabad (IN); Narayana Guru Prasada Lakshmi Mandaleeka, Hyderabad (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 13/781,642

(22) Filed: Feb. 28, 2013

(65) Prior Publication Data

US 2014/0245254 A1 Aug. 28, 2014

(51) Int. Cl.
*G06F 9/44* (2006.01)
*G06Q 10/00* (2012.01)

(52) U.S. Cl.
CPC . *G06F 8/10* (2013.01); *G06Q 10/00* (2013.01)

(58) Field of Classification Search
None
See application file for complete search history.

(56) References Cited

U.S. PATENT DOCUMENTS

| 7,571,149 | B1 * | 8/2009 | Yanosy, Jr. | 706/52 |
|---|---|---|---|---|
| 7,958,494 | B2 * | 6/2011 | Chaar et al. | 717/120 |
| 7,962,891 | B2 * | 6/2011 | Kimelman et al. | 717/104 |
| 8,141,040 | B2 * | 3/2012 | Chaar et al. | 717/120 |
| 8,464,205 | B2 * | 6/2013 | Chaar et al. | 717/120 |
| 8,645,904 | B2 * | 2/2014 | Coldicott et al. | 717/104 |
| 8,656,343 | B2 * | 2/2014 | Fox et al. | 717/101 |
| 8,683,434 | B2 * | 3/2014 | Charfi et al. | 717/120 |
| 2003/0074648 | A1 * | 4/2003 | Brassard et al. | 717/104 |
| 2004/0030723 | A1 | 2/2004 | Gerstl et al. | |
| 2004/0237066 | A1 * | 11/2004 | Grundy et al. | 717/104 |
| 2005/0128212 | A1 * | 6/2005 | Edecker et al. | 717/104 |

(Continued)

FOREIGN PATENT DOCUMENTS

CN 101378583 A 3/2009

OTHER PUBLICATIONS

Chirinos et al., "Identifying Quality-Based Requirements", Information Systems Management, Winter 2004, pp. 15-26; <http://www.researchgate.net/publication/220630076_Identifying_QualityBased_Requirements/links/0deec51c209dad3880000000>.*

(Continued)

*Primary Examiner* — Thuy Dao
*Assistant Examiner* — Ben C Wang
(74) *Attorney, Agent, or Firm* — Blakely, Sokoloff, Taylor & Zafman LLP

(57) ABSTRACT

A method(s) and system(s) of identifying quality requirements for a software product to be developed is disclosed. The method includes receiving input data from a user. The input data is indicative of objectives to be met by the software product being developed. The method further includes mapping the input data with a pre-defined product quality requirement model (PQRM). The PQRM is retrieved from a database and includes a taxonomy tree configured to define a plurality of quality characteristics (QCs), a plurality of sub-QCs, a plurality of quality objectives (QOs), and a plurality of quality requirements (QRs) for the software product. Further, the method includes identifying at least one QR from the plurality of QRs applicable for the software product. The identification is based on the input data. The method also includes generating a product requirement report (PRR) for the software product based on the identification.

13 Claims, 4 Drawing Sheets

(56) References Cited

U.S. PATENT DOCUMENTS

| | | | |
|---|---|---|---|
| 2006/0174222 | A1 | 8/2006 | Thonse et al. |
| 2008/0021925 | A1 | 1/2008 | Sweeney |
| 2008/0229195 | A1* | 9/2008 | Brauel et al. ............... 717/120 |
| 2008/0235655 | A1* | 9/2008 | Defour et al. ............... 717/104 |
| 2008/0256507 | A1* | 10/2008 | Chaar et al. ............... 717/101 |
| 2009/0055795 | A1* | 2/2009 | Finlayson et al. ............. 717/101 |
| 2009/0300577 | A1* | 12/2009 | Bernardini et al. ........... 717/101 |
| 2010/0011337 | A1* | 1/2010 | Young et al. ............... 717/104 |
| 2010/0023918 | A1* | 1/2010 | Bernardini et al. ........... 717/101 |
| 2010/0031226 | A1* | 2/2010 | Chaar et al. ............... 717/101 |
| 2010/0095266 | A1* | 4/2010 | Novak ..................... 717/101 |
| 2010/0115490 | A1* | 5/2010 | Wilcock et al. ............. 717/104 |
| 2011/0099532 | A1* | 4/2011 | Coldicott et al. ............ 717/105 |
| 2011/0302550 | A1* | 12/2011 | Jackson et al. ............. 717/104 |
| 2012/0079450 | A1* | 3/2012 | Reech et al. ............... 717/104 |
| 2012/0117539 | A1* | 5/2012 | Vorthmann et al. .......... 717/120 |
| 2012/0216105 | A1* | 8/2012 | Poddar et al. ............... 715/222 |
| 2013/0212552 | A1* | 8/2013 | He ......................... 717/101 |

OTHER PUBLICATIONS

Castillo et al., "Requirements, Aspects and Software Quality: the REASQ model", Journal of Object Technology, 2010, pp. 69-91; <http://www.researchgate.net/publication/220299390_REquirements_Aspects_and_Software_Quality_the_REASQ_model/links/...2000000>.*

Dehkharghani et al., "Automatically Identifying a Software Product's Quality Attributes through Sentiment Analysis of Tweets", May 2013 IEEE, NaturaLiSE 2013, pp. 25-30; <http://ieeexplore.ieee.org/stamp/stamp.jsp?tp=&arnumber=6611717>.*

Janakiram et al., "ReQuEst: Requirements-driven Quality Estimator", Jan. 2005, ACM, vol. 30 No. 1, pp. 1-9; <http://dl.acm.org/results.cfm?h=1&cfid=462092452&cftoken=86030066>.*

John Mylopoulus, et al., "Representing and using non-functional requirements: a process-oriented approach," IEEE Transactions on Software Engineering, vol. 18, No. 6, 23 pages (Jun. 1992).

"IEEE Recommended practice for software requirements specifications," IEEE Std 830-1998, 37 pages (Jun. 25, 1998).

Lawrence Chung, et al., "Conceptual Modeling: Foundations and Applications: on non-functional requirement in software engineering," Book, pp. 363-379 (2009).

Jonathan Tate, "Software process quality models: A comparative evaluation," M.Sc. Thesis, University of Durham, Department of Computer Science, i-viii, and 1-175 (2003).

Mario Barbacci, et al., "Quality Attributes." Software Engineering Institute, Carnegie Mellon University,Technology Report, CMU/SEI-95-TR-021, ESC-TR-95-021, i-vi, and 1-55 (Dec. 1995).

Drazen Milicic, "Software Quality Attributes and Trade-Offs: Software quality models and philosophies," Blekinge Institute of Technology, Ph.D Course, 17 pages (Jun. 2005).

Joerg Doerr, et al., "Non-Functional requirements in industry—Three cases studies adopting an experience-based NFR method," Proceedings of the 2005 13$^{th}$ IEEE International Conference on Requirements Engineering (RE '05), 10 pages (Jul. 2005).

"Systems and software engineering-system and software quality requirements and evaluation (SQuaRE)—systems and software quality models," Final Draft, International Standard, ISO/IEC FDIS 25010, 44 pages (2010).

Capers Jones & Associates LLC, "Software quality in 2011: A survey of the state of the art," 29 pages (Aug. 31, 2011).

John R. Hauser, et al., "The House of quality," Harvard Business Review, 16 pages (May-Jun. 1998).

Notice from the European Patent Office dated Oct 1, 2007, concerning business methods Official Journal of the European Patent Office, OEB; vol. 30; No. 11; Nov. 1, 2007; pp. 592-593; XP007905525; ISSN: 0170-9291; 2pgs.

PCT International Search Report for PCT Application No. PCT/IB2014/000206; mailed on Jun. 30, 2014; 4pgs.

* cited by examiner

IDENTIFYING QUALITY REQUIREMENTS OF A SOFTWARE PRODUCT

TECHNICAL FIELD

The present subject matter relates, in general, to quality requirements, and in particular, to identifying the quality requirements of a software product.

BACKGROUND

Software products are increasingly used to perform a wide variety of functions. Goals and objectives of the software products may be realized by defining quality requirements associated with the software products. The quality requirements may include functional as well as non-functional requirements of the software products. The functional requirements describe what the software product has to do. The non-functional requirements are those requirements which stipulate how well the software programs does, such as security, performance, usability, and reliability of the software products. The non-functional requirements play a crucial role during development of the software products.

Various models and frameworks have been developed as an attempt for eliciting the non-functional software requirement for a software product to be developed. These frameworks and models are designed to facilitate in identifying the functional and non-functional requirements applicable for the software products.

SUMMARY

This summary is provided to introduce concepts related to identifying the quality requirements of a software product, which are further described below in the detailed description. This summary is neither intended to identify essential features of the claimed subject matter nor is it intended for use in determining or limiting the scope of the claimed subject matter.

In an embodiment, method(s) and system(s) of identifying quality requirements for a software product to be developed is disclosed. The method may include receiving input data from a user. The input data may be indicative of objectives to be met by the software product being developed. The method may further include mapping the input data with a pre-defined product quality requirement model (PQRM). The PQRM may be retrieved from a database and may include a taxonomy tree configured to define a plurality of quality characteristics (QCs), a plurality of sub-QCs, a plurality of quality objectives (QOs), and a plurality of quality requirements (QRs) for the software product. Further, the method may include identifying at least one QR from the plurality of QRs applicable for the software product. The identification is based on the input data. The method may also include generating a product requirement report (PRR) for the software product based on the identification.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
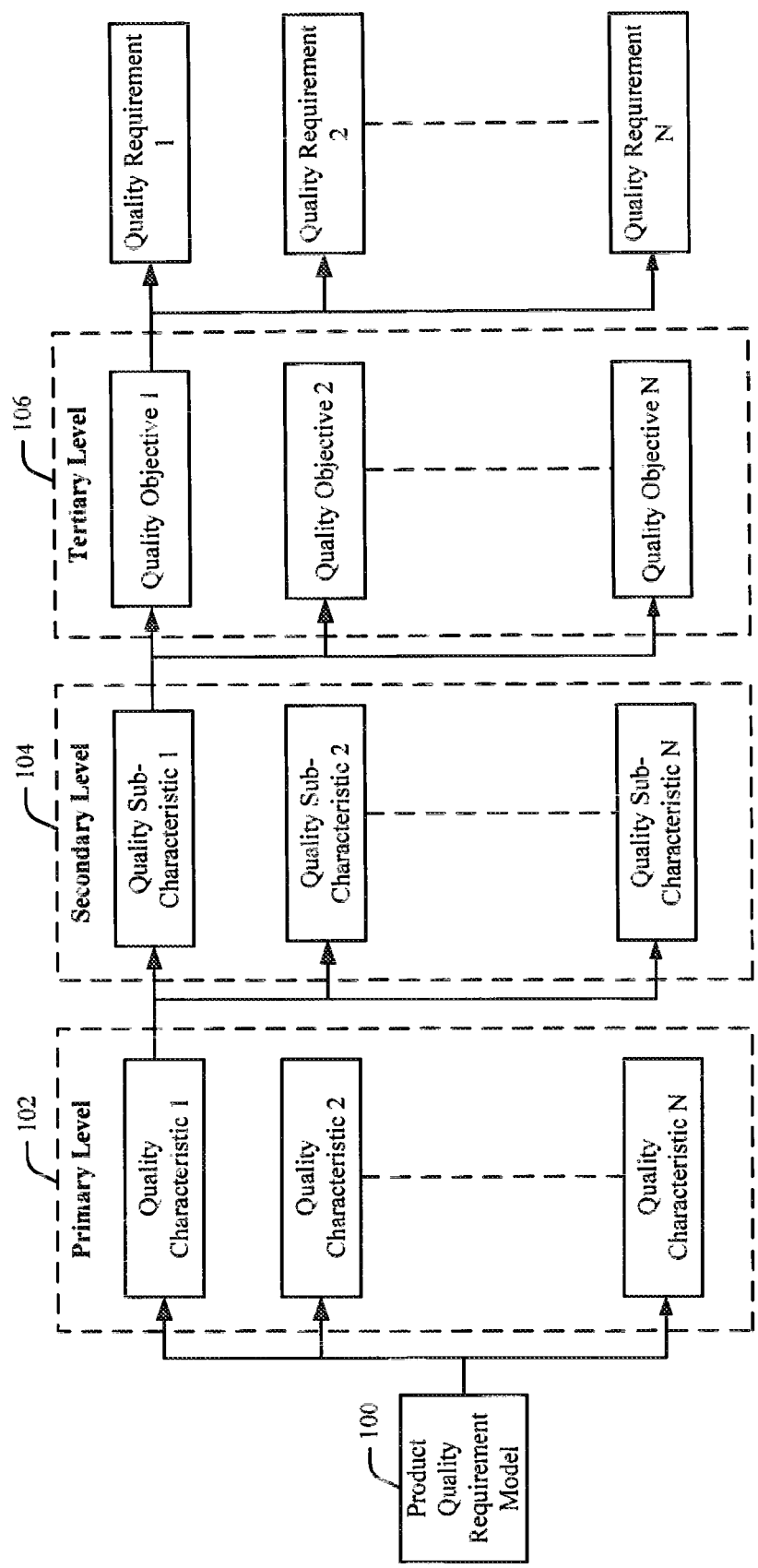
FIG. 1 illustrates a schematic view of product quality requirement model, according to an implementation of the present subject matter.

The present subject matter relates to a system and a method of identifying quality requirements of a software product.

Typically, quality requirements of a software product are defined during requirement phase in lifecycle of the software product. The quality requirements may include functional and non-functional requirements of the software product. The functional requirements describe what the software product has to do. The non-functional requirements are mostly those requirements that stipulate how well does the software product performs. The non-functional requirements include, for example, security, performance, usability, and reliability of a software product. Generally, the non-functional requirements of a software product are not explicitly defined. This makes it difficult to identify any defects that may be related to the non-functional requirements of the software product. Further, as the non-functional requirements of the software product are not stated explicitly, such requirements are not as clear to stakeholders' as compared to the functional requirements. This poses a challenge in eliciting the non-functional requirements of the software product.

If the quality requirements of the software product are not stated clearly beforehand, particularly, before a design phase and a development phase of the software lifecycle, it becomes difficult to ensure that the software product that is being designed and developed will meet such requirements. Many software products are found to lack certain quality requirements either at the time of testing or during its operation in the production environment. This may often require re-designing and/or modifications in the software code, and re-testing, which is an iterative, time consuming and resource intensive process. For example, the software products may meet their functional requirements but may need to be redesigned due to lack of non-functional requirements, such as difficulty in maintaining, porting, and scalability to required volumes. This causes lot of subjectivity and ambiguity in elicitation of non-functional requirements of the software products.

Various standards and reference models provide for ways to distinguish among different types of quality concerns. For example, standards defined in ISO 9126 and 25010 define seven quality characteristics (QCs) which are further divided into 30 sub-QCs. Further, a quality model as proposed by McCall defines software product attribute as a hierarchy of quality factors, quality criteria, and quality metrics. Moreover, Boehm's model also proposes a hierarchy of well-defined characteristics of product quality. However, these reference models and standards fail to provide next level of classification scheme that may be helpful in eliciting individual quality requirements. Further, the existing reference models and standards define only those quality requirements that may be relevant for specific software products.

Currently, taxonomies that are available for defining quality characteristics of the software products describe only the primary and secondary levels. However, this may not be adequate for eliciting the quality requirements of the software product in a comprehensive manner. At the requirements stage, the requirements are generally elicited only for some QCs like security, performance and for other QCs the product quality requirements are implicit and not documented. An integrated view is not taken to elicit the software product quality requirements, which affects the design decisions and overall quality of the software product.

Typically, requirements of a software product are defined before developing the software product. There may be scenarios where the existing software products are unable to meet the requirements as expected by the developer. Alternatively, there may be scenarios where the requirements for such software products are not defined properly before developing the requirements.

The present subject matter describes systems and methods for identifying the quality requirements of a software product. According to an aspect, the quality requirements of the software product are identified based on a product quality requirement model. Accordingly, in an embodiment, the product quality requirement model is implemented in the systems and the methods described herein.

According to an implementation, the present subject matter discloses a product quality requirement model for identifying the quality requirements for a software product to be developed. The product quality requirement model may include a taxonomy tree having three levels, namely a primary level, a secondary level, and a tertiary level. The primary level may be configured to define quality characteristics (QCs) which identify the major quality concerns of the software product in focus from overall business perspective, the secondary level may be configured to define sub-QCs associated with each QC, and the tertiary level may be configured to define quality objectives (QOs) that may be associated with each sub-QC. For example, the product quality requirement model may include seven QCs, 35 sub-QCs, and 108 QOs.

Each of the QO defines a required capability associated with the QC/sub-QC that needs to be built in the software product. Further, the product quality requirement model may be understood as a reference model for identifying the quality requirements of the software product. Accordingly, the product quality requirement model of the present subject matter provides a structured and consistent way of identifying and eliciting the quality requirements associated with the software product. The three levels of the product quality requirement model ensure consistency and completeness in determining the quality requirements of the software product. The product quality requirement model provides granular levels of classification. For example, for Security QC, the sub-QCs may include authentication, confidentiality, integrity, and accountability. The product quality requirement model extends the list and definitions of the sub-QCs by including the tertiary level of QOs, such as multi-channel capability, data retention, multiplatform capability, and monitoring.

In another implementation, the QOs may be added/modified in the existing set of QOs for any QC and sub-QC. This may enable customization of the product quality requirement model as per the needs of different software products.

In yet another implementation, the system of the present subject matter may facilitate in selecting the applicable QCs for the software product. A user may at every level of the product quality requirement model select the QCs, the sub-QCs, and the QOs for being built in the software product. Further, each of the QOs may be associated with one or more quality requirements (QRs) that need to be built in the software product. Accordingly, the system may be configured to determine the QRs for being developed in the software product. Further, the system may be configured to generate a product requirement report (PRR). The PRR may be configured to include details of the various QCs, sub-QCs, QQs and the QRs for being built in the software product. The PRR may facilitate in explicitly documenting the QRs of the software product.

The present subject matter also facilitates in identifying any gaps in the quality requirements of existing software products. For example, the system may be configured to compare an existing software product with the product quality requirement model. Based on the comparison, the system may generate a gap analysis report indicating the quality requirements that may be missing in the existing software product. Accordingly, a user may modify the existing software product to meet the quality requirements.

Accordingly, the product quality requirement model of the present subject matter facilitates in eliciting the quality requirements of the software products. The product quality requirement model extends the quality requirements of the software product by introducing the tertiary level of taxonomy for all software product quality characteristics/sub characteristics. The tertiary level may facilitate in identifying or classifying the quality objectives for each of the identified product quality sub characteristics. Further, the product quality requirement model may facilitate in identifying gaps in defining the quality requirements of existing quality requirements. Based on the gap analysis report, the quality requirements for the existing software products may be identified and the software product may be developed or modified accordingly, thereby avoiding re-designing or further iterations.

These and other advantages of the present subject matter would be described in greater detail in conjunction with the following figures. While aspects of described systems and methods for eliciting the quality requirements of a software product can be implemented in any number of different computing systems, environments, and/or configurations, the embodiments are described in the context of the following exemplary system(s).

FIG. 1 illustrates a schematic view of a product quality requirement model (PQRM) 100, according to an implementation of the present subject matter. According to an aspect, the purpose of the PQRM 100 is to identify quality requirements of a software product. In an example, the identification of the quality requirements of the software product can be based on three quality requirement levels, namely, primary 102, secondary 104, and tertiary 106. The three quality requirement levels are described as below.

The primary level 102 of the PQRM 100 includes seven major quality characteristics (QCs). The QCs relate to an outcome of interaction when a software product is used in a particular context of use. These QCs identify major quality concerns or non-functional requirements of the software product in consideration. The PQRM 100 of the present subject matter facilitates in identifying, that for the software product under consideration, what all QCs would be applicable from amongst the N QCs. Examples of the QCs may include, but are not limited to, security, compatibility, reliability, and performance. Further, the QCs that may be applicable for the software product may be defined by a stakeholder based on the use of the software product.

The secondary level 104 of the PQRM 100 indicates the sub-QCs that define sub-set of the QCs for each major QC. The PQRM 100 of the present subject matter defines 35 sub-QCs. For example, for the security QC, the PQRM 100 provides the sub-QCs as authentication, confidentiality, integrity, accountability, and non-repudiation.

Further, the tertiary level 106 of the PQRM 100 indicates a plurality of quality objectives (QOs). The QOs define required capability for being built in the software product. In other words, for the software product under consideration, the PQRM 100 facilitates in defining the requirements for a set of capabilities associated with each QC. Considering the above example, for the security QC and accountability as the sub-QC, the QOs for being built in the software product may include audit and fault logging, clock synchronization, protection of log information, and the like. Furthermore, for each QO, the PQRM 100 defines one or more quality requirements. The quality requirements may be understood as the requirements that need to be elicited in the software product.

Furthermore, Table 1 below provides an exemplary illustration of PQRM 100 in accordance with an implementation of the present subject matter. The table below indicates various requirements across the three levels of the PQRM 100, which should be built in the software product when usability is selected as the QC.

TABLE 1

| QC | Sub-QC | QO | Quality Requirement |
|---|---|---|---|
| Security | Authentication | User Registration | Assign a unique ID to each person with computer access |
| | | User identification and authentication | Identify all users with a unique user name before allowing them to access system components or cardholder data |
| | | | Set the lockout duration to 30 minutes or until administrator enables the user ID |
| | | | Authenticate all access to any database containing cardholder data. This includes access by applications, administrators, and all other users. |
| | | | Control addition, deletion, and modification of user IDs, credentials, and other identifier objects |
| | | | Remove inactive user accounts at least every 90 days |
| | | | Enable accounts used by vendors for remote maintenance only during the time period needed |
| | | User password management | Ensure proper user authentication and password management for non-consumer users and administrators on all system components as follows: Verify user identity before performing password resets |
| | | | Set first-time passwords to a unique value for each user and change immediately after the first use |
| | | | Immediately revoke access for any terminated users |
| | | | Require a minimum password length of at least seven characters |
| | | | Use passwords containing both numeric and alphabetic characters |
| | | | Do not allow an individual to submit a new password that is the same as any of the last four passwords he or she has used |
| | | | Limit repeated access attempts by locking out the user ID after not more than 6 attempts |
| | | Enforcement of password policy | Communicate password procedures and policies to all users who have access to cardholder data |
| | | | Do not use group, shared, or generic accounts and passwords |
| | | | Change user passwords at least every 90 days |
| | | Authentication Methods (one-way, multi-factor, etc.) | In addition to assigning a unique ID, employ at least one of the following methods to authenticate all users: • Password • Token devices (e.g., Secure ID, certificates, or public key) • Biometrics |

A first column of Table 1 lists a selected or applicable QC for the software product under consideration. A second column includes the sub-QCs that may be associated with the selected QC. As described above, each QC may include more than one sub-QC. Further, column 3 of Table 1 includes a list of QOs that may be associated with each of the sub-QC. The PQRM 100 explicitly defines the QOs for each of the sub-QCs for ease of identification of the quality requirements of the software product. Further, as mentioned above, each QO may be associated with at least one QR. These QRs indicate the capabilities to be built in the software product.

Furthermore, the PQRM 100 is implemented in a requirement identification system, according to an implementation of the present subject matter. In said implementation, the requirement identification system can be configured to identify the quality requirements of the software product, based on the PQRM 100. The requirement identification system is described in detail with reference to FIG. 2.

Figure 2:
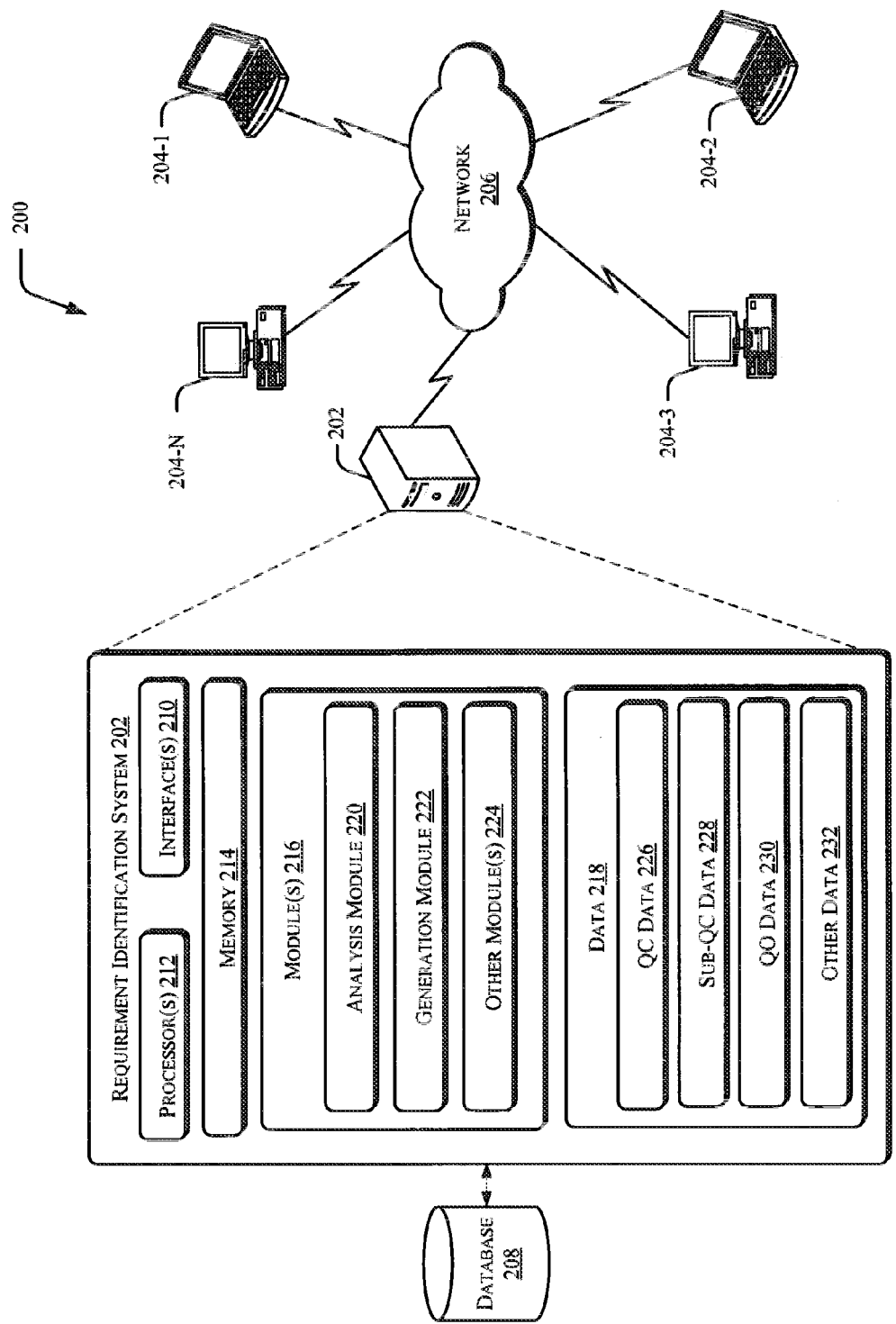
FIG. 2 illustrates a network environment implementation of a requirement identification system, in accordance with an embodiment of the present subject matter.

FIG. 2 illustrates a network environment 200 implementing a requirement identification system 202, in accordance with an embodiment of the present subject matter. In said embodiment, the network environment 200 includes the requirement identification system 202 configured to identify the quality requirements for a software product based on the PQRM 100. The PQRM 100 defines three requirement levels, namely the primary level 102, the secondary level 104, and the tertiary level 106 for eliciting the quality requirements of the software product.

In one implementation, the network environment 200 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business. In another implementation, the network environment 200 may be a smaller private network. In yet another implementation, the network environment 200 may be a public network, such a public cloud.

The requirement identification system 202 may be implemented in a variety of computing systems, such as a laptop computer, a desktop computer, a notebook, a workstation, a mainframe computer, a server, a network server, and the like. In one implementation, the requirement identification system 202 may be included within an existing information technology infrastructure or a database management structure. Further, it will be understood that the requirement identification system 202 may be connected to a plurality of user devices 204-1, 204-2, 204-3, . . . , 204-N, collectively referred to as the user devices 204 or as an individual user device 204. The user device 204 may include, but is not limited to, a desktop computer, a portable computer, a mobile phone, a handheld device, and a workstation. The user devices 204 may be used by users, such as database analysts, programmers, developers, data architects, software architects, module leaders, projects leaders, database administrator (DBA), stakeholders, and the like.

As shown in the figure, the user devices 204 are communicatively coupled to the requirement identification system 202 over a network 206 through one or more communication links for facilitating one or more end users to access and operate the requirement identification system 202. In one implementation, the network 206 may be a wireless network, a wired network, or a combination thereof. The network 206 may also be an individual network or a collection of many such individual networks, interconnected with each other and functioning as a single large network, e.g., the Internet or an intranet. The network 206 may be implemented as one of the different types of networks, such as intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 206 may include a variety of network devices, including routers, bridges, servers, computing devices, storage devices, and the like.

In an implementation, the requirement identification system 202 may be coupled to a database 208. Although not shown in the figure, it will be understood that the database 208 may also be connected to the network 206 or any other network in the network environment 200. In an implementation, the database 208 may include various input files containing the PQRM 100 that may be used by the requirement identification system 202. In an implementation, the database 208 may be provided as a relational database and may store data in various formats, such as relational tables, object oriented relational tables, indexed tables. However, it will be understood that the database 208 may be provided as other types of databases, such as operational databases, analytical databases, hierarchical databases, and distributed or network databases.

The requirement identification system 202 further includes interface(s) 210, for example, to provide the input data in a hierarchical manner. Further, the interface(s) 210 may include a variety of software and hardware interfaces, for example, interfaces for peripheral device(s), such as a keyboard, a mouse, an external memory, and a printer. Additionally, the interface(s) 210 may enable the requirement identification system 202 to communicate with other devices, such as web servers and external repositories. The interface(s) 210 may also facilitate multiple communications within a wide variety of networks and protocol types, including wired networks, for example, LAN, cable, etc., and wireless networks, such as WLAN, cellular, or satellite. For the purpose, the interface(s) 210 may include one or more ports.

In an implementation, the requirement identification system 202 includes a processor(s) 212 coupled to a memory 214. The processor(s) 212 may be implemented as one or more microprocessors, microcomputers, microcontrollers, digital signal processors, central processing units, state machines, logic circuitries, and/or any devices that manipulate signals based on operational instructions. Among other capabilities, the processor(s) 212 may be configured to fetch and execute computer-readable instructions stored in the memory 214.

The memory 214 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the requirement identification system 202 includes module(s) 216 and data 218. The module(s) 216 include, for example, an analysis module 220, a generation module 222, and other module(s) 224. The other module(s) 224 may include programs or coded instructions that supplement application or functions performed by the requirement identification system 202.

The data 218 may include QC data 226, sub-QC data 228, QO data 230, and other data 232. The other data 232, amongst other things, may serve as a repository for storing data that is processed, received, or generated as a result of the execution of one or more modules in the module(s) 216. Although the data 218 is shown internal to the requirement identification system 202, it may be understood that the data 218 can reside in an external repository (not shown in the figure), which may be coupled to the requirement identification system 202. The requirement identification system 202 may communicate with the external repository through the interface(s) 210 to obtain information from the data 218.

As mentioned herein, the present subject matter discloses a system and a method for identifying quality requirements of a software product. The present subject matter discloses a requirement model that is configured to define taxonomy for the quality requirements of software products. The requirement model may include three levels of taxonomy for defining quality characteristics, sub-quality characteristics, and quality objectives for the software products.

In an implementation, the requirement identification system 202 may identify various qualities of a software product when the software product is in a requirement phase. The requirement phase may encompass those tasks that go into determining needs or conditions to meet for the software product. As a software product may have various stakeholders including those who develop, acquire, use, or who are customers of businesses, the requirement phase takes into account possibly conflicting requirements of the various stakeholders. The capabilities or conditions may be defined by the stakeholders for being developed in the software product. According to the present implementation, the analysis module 220 may be configured to analyze quality requirements of a software product. It will be understood to a person skilled in the art that the analysis module 220 may be configured to retrieve the PQRM 100 from the database 208. Based on the PQRM 100, the analysis module 220 may be configured to map the quality requirements of the software product with the quality requirements defined in the PQRM 100. Based on the mapping, the analysis module 220 may identify the QRs that may be applicable for the software product.

The analysis module 220 may be configured to receive input data from a user. The input data may be indicative of objectives to be met the software product being developed. A user may be understood as a stakeholder in the software product. In an implementation, the user may manually select the at least one QC. In another implementation, the user may define or describe the attributes for being developed in the software product. Based on the definition by the user, the analysis module 220 may be configured to select the at least one QCs for the software product in consideration. The analysis module 220 may be configured to store the at least one identified QC as QC data 226. In an implementation, the analysis module 220 may be configured to select at least one QC from the primary level 102 of the PQRM 100. It will be evident that the analysis module 220 may select the at least one QC for the software product based on the input data as received from a user.

Further, the analysis module 220 may be configured to determine one or more sub-QCs that may be relevant for the software product. The one or more sub-QCs may be based on the at least one selected QC. For example, as shown in Table 1, for security QC, the sub-QC may include authentication. The analysis module 220 may be configured to store the one or more determined sub-QCs as sub-QC data 228.

Further, the analysis module 220 may be configured to identify the QOs that may be associated with the one or more determined sub-QCs. As described above, the tertiary level 106 of the PQRM 100 defines a plurality of QOs that may be applicable for a software product. Accordingly, based on the PQRM 100, the analysis module 220 may identify the one or more QOs for the software product. The analysis module 220 may be configured to store the one or more determined QOs as QO data 230. The PQRM 100 may also define the quality requirements associated with each of the QOs for being built in the software product. Therefore, the analysis module 220 may be configured to identify the various QCs, sub-QCs, QOs, and QRs for a software product.

In another implementation, the software product may be in the production phase, where the software product is in use. In the production phase, there may be instances where the software product might not be able to perform as per the expectations of the stakeholders. In such instances, the analysis module 220 with the help of the PQRM 100 may facilitate in identifying gaps in the quality requirements for the software product. The requirement identification system 202 of the present subject matter may facilitate in identifying gaps associated with the requirements of an existing software product.

In an implementation, the present subject matter facilitates in identifying the requirements that may be applicable for the software product. The analysis module 220 may be configured to identify the requirements as defined by the PQRM 100 for the existing software product. Upon identification, the analysis module 220 may compare pre-defined quality requirements of the existing product with the identified quality requirements. Thereby the requirement identification system 202 may facilitate in identifying any gaps in defining the quality requirements for the existing software product.

In an implementation, the generation module 222 may be configured to collate the various QCs and sub-QCs that may be identified by the analysis module 220. Accordingly, the generation module 222 may generate a product requirement report (PRR) containing the various QCs and sub-QCs identified from the PQRM 100 for the software product in consideration. The PRR may facilitate developers to design the software product keeping in mind the quality requirements highlighted by the PRR. The PRR provides a documentation of the quality requirements of the software product at a granular level.

In another implementation, the generation module 122 may also be configured to generate a gap analysis report as indicated in Table 2 below.

TABLE 2

| S. No. | QC | Sub-QC | Project NFRs Vs Taxonomy DB |
|---|---|---|---|
| 1 | Regulatory | Compliance | Captured |
| 2 | Security | Authentication | Missing |
|  |  | Authorization | Captured |
|  |  | Confidentiality | Captured |
|  |  | Accountability | Missing |
|  |  | Integrity | Captured |
|  |  | Non-Repudiation | Missing |
| 3 | Performance | Capacity Planning | Missing |
|  |  | Time Behaviour | Captured |
|  |  | Resource Utilization | Captured |
|  |  | Data Management | Captured |
| 4 | Compatibility | Interoperability | Captured |
|  |  | Coexistence | Captured |
|  |  | Multi-Channel Capability | Missing |
| 5 | Reliability | Availability | Missing |
|  |  | Fault Tolerance | Captured |
|  |  | Recoverability | Captured |
|  |  | Maturity | Missing |

Based on the comparison performed by the analysis module 220, the generation module 222 may be configured to generate the gap analysis report as indicated by table 2 above. The gap analysis report clearly indicates the non-functional requirements that are missing in the existing software product under consideration. The analysis module 220 of the requirement identification system 202 maybe configured to compare the software product feature by feature with the PQRM 100. Based on the comparison, the analysis module 220 may identify the non-functional requirements that are missing in the software product. Thereafter, the generation module 222 may be configured to generate a gap analysis report as indicated in Table 2 above.

Accordingly, the present subject matter facilitates in eliciting the quality requirements of the software products. The product quality requirement model extends the quality requirements of the software products by introducing the tertiary level of taxonomy for all software product quality characteristics/sub characteristics. The tertiary level may facilitate in identifying or classifying the quality requirements into various quality characteristics and objectives. Further, the product quality requirement model may facilitate in identifying gaps in defining the quality requirements of existing software products. Based on the PRR, the quality requirements for the software products may be identified and the software product may be developed or modified accordingly.

Figure 3:
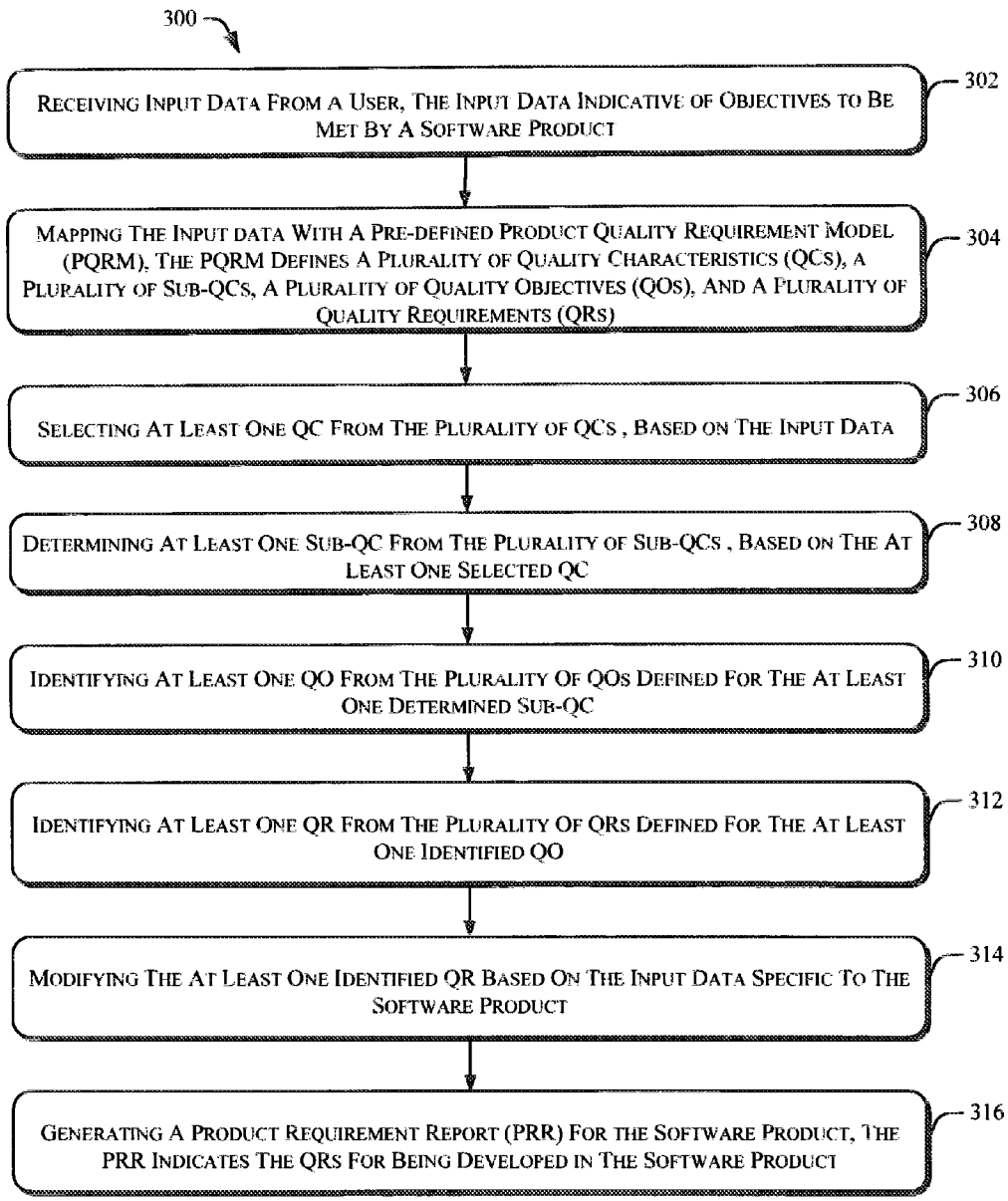
FIG. 3 shows a flowchart illustrating a method of identifying the quality requirements for a software product to be developed, in accordance with an embodiment of the present subject matter.
Figure 4:
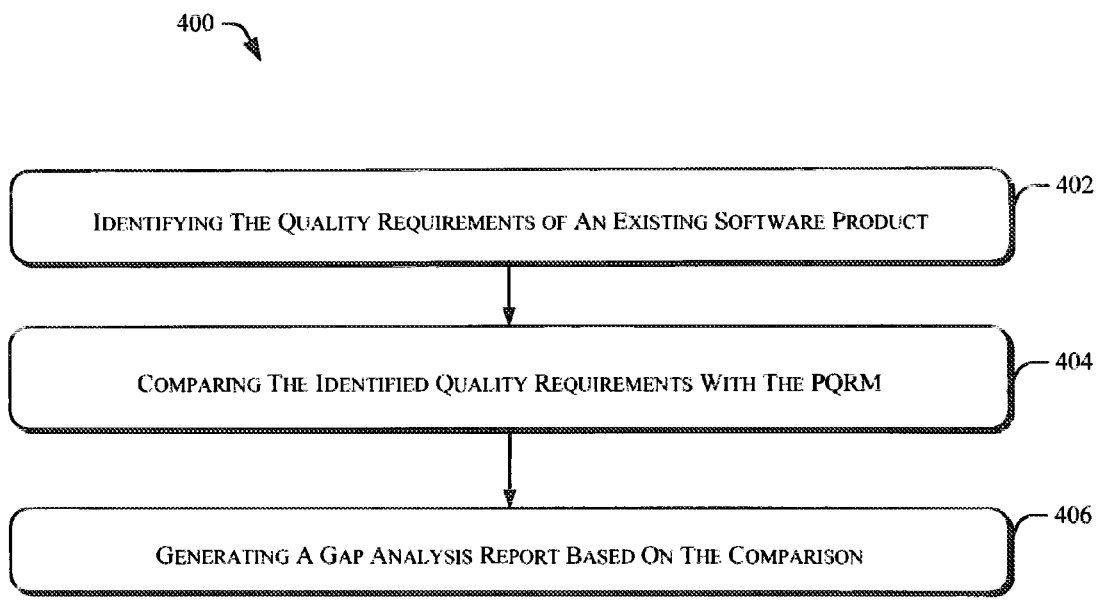
FIG. 4 shows a flowchart illustrating a method for generating a gap analysis report for an existing software product, in accordance with an embodiment of the present subject matter.

FIG. 3 illustrates a method 300 for identifying quality requirements for a software product to be developed while FIG. 4 illustrates a method 400 for generating a gap analysis report, in accordance with different embodiments of the present subject matter. The methods 300 and 400 may be described in the general context of computer executable instructions. Generally, computer executable instructions can include routines, programs, objects, components, data structures, procedures, modules, functions that perform particular functions or implement particular abstract data types. The methods 300 and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 300 and 400 are described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

At block 302, the method 300 may include receiving input data from a user. The input data may be indicative of objectives to be met by the software product being developed. In an implementation, the analysis module 220 may be configured to receive the input data. It will be evident to a person skilled in the art that the software product may have various stakeholders including those who develop, acquire, use, or who are customers of businesses. The input data may include capabilities or conditions defined by the stakeholders for being developed in the software product.

At block 304, the method 300 may include mapping the input data with a pre-defined product quality requirement model (PQRM) 100 from the database 208. The PQRM 100 may include a taxonomy tree configured to define a plurality of quality characteristics (QCs) at a primary level, a plurality of sub-QCs at a secondary level, and a plurality of quality objectives (QOs) at a tertiary level, for the software product. The PQRM 100 may further include a plurality of quality requirements (QRs) associated with each of the plurality of QOs. As per the PQRM 100, each of the plurality of QCs may be associated with one or more sub-QCs. Further, each of the plurality of sub-QC may be associated with one or more QOs.

At block 306, the method 300 may include selecting at least one QC that may be applicable for the software product, from the plurality of QCs of the PQRM. In an implementation, the analysis module 220 may be configured to select the at least one QC. Further, the selection of the at least one QC may be based on the input data provided by the user.

At block 308, the method 300 may include determining at least one sub-QC that may be applicable for the software product. In an implementation, the analysis module 220 may be configured to select the at least one sub-QC. Further, the at least one sub-QC may be associated with the at least one selected QC.

At block 310, the method 300 may include identifying at least one QO that may be applicable for the software product, based on the input data. In an implementation, the analysis module 220 may be configured to select the at least one QO. It will be understood that the at least one QO will be associated with the determined sub-QCs. As described earlier, the PQRM 100 may also include quality requirements associated with each of the QOs.

At block 312, the method 300 may include identifying at least one QR from the plurality of QRs, defined for the at least one identified QO. In an implementation, the analysis module 220 may be configured to select the at least one QR. Accordingly, the quality requirements of the software product may be elicited based on the identified QOs.

Further, at block 314, the method 300 may include modifying the at least one identified QR based on the input data specific to the software product. The analysis module 220 may be configured to modify the at least one identified QR based on the input data specific to the software product.

At block 316, the method 300 may include generating a product requirement report (PRR) based on the identified QRs of the software product. In an implementation, the generation module 222 may be configured to generate the PRR. The PRR may provide a hierarchical classification from the identified QCs till the quality requirements for the software product under consideration.

Referring to FIG. 4, at block 402, the method 400 may include identifying quality requirements of an existing software product. The analysis module 220 may be configured to identify the quality requirements of the existing software. Further, it will be evident to a person skilled in the art that the identification module 220 may determine the QC, sub-QCs, and the QOs, if any for the existing software product.

At block 404, the method 400 may include comparing the identified quality requirements of the existing software product with the PQRM 100. The analysis module 220 may be configured to compare the identified quality requirements of the existing software product with the quality requirements of the PQRM 100. Based on the comparison, the analysis module 220 may be configured to determine the quality requirements that may be absent in the existing software product.

At block 406, the method 400 may include generating a gap analysis report for the existing software product. In an implementation, the generation module 222 may be configured to generate the gap analysis report. The gap analysis report may indicate the quality requirements that may be missing in the existing software product.

Although embodiments for identification of quality requirements of a software product have been described in language specific to structural features and/or methods, it is to be understood that the present subject matter is not necessarily limited to the specific features or methods described. Rather, the specific features and methods are disclosed as exemplary implementations for the requirement identification system.

We claim:

1. A computer-implemented method of identifying quality requirements of a software product to be developed, the method comprising:
   receiving, by a processor, input data from a user, wherein the input data is indicative of one of objectives to be met by the software product being developed and pre-defined quality requirements of an existing software product;
   mapping, by the processor, the input data with a pre-defined product quality requirement model (PQRM), wherein the PQRM is retrieved from a database and comprises of a taxonomy tree that defines,
      a primary level containing a plurality of quality characteristics (QCs) configured to define attributes for being developed in the software product,
      a secondary level configured to define a plurality of sub-QCs for each QC of the primary level,
      a tertiary level configured to identify a plurality of quality objectives (QOs) based on each of the sub-QCs of the secondary level, wherein the each of the plurality of QOs defines a capability associated with the sub-QC for being built in the software product, and
      a plurality of quality requirements (QRs) for being elicited in the software product, wherein the mapping comprises comparing the input data with each of the plurality of QCs;
   identifying, by the processor, at least one QR from the plurality of QRs applicable for the software product and at least one gap in the quality requirements of the existing software product, wherein the identification is based on the mapping of the input data with the FORM; and
   generating, by the processor, a report for the software product based on the identification.

2. The computer-implemented method of claim 1, wherein the identifying the at least one QR comprises:
   selecting at least one QC from the plurality of QCs for the software product, wherein the selection is based on the comparison of the input data with the PQRM;
   determining at least one sub-QC from the plurality of sub-QCs for the at least one selected QC; and
   identifying at least one QO from the plurality of QOs, wherein the identification is based on the at least one determined sub-QC.

3. The computer-implemented method of claim 1 further comprising modifying the at least one identified QR based on the input data specific to the software product.

4. The computer-implemented method of claim 1, wherein the identifying the at least one gap in the quality requirements of the existing software product comprises comparing the identified quality requirements of the existing software product with the quality requirements in the pre-defined FORM.

5. The computer-implemented method of claim 1, wherein the report is a gap analysis report for the existing software product based on the identification.

6. The computer-implemented method of claim 1, wherein the report is a product requirement report (PRR) for the software product to be developed and wherein the PRR comprises details of the QCs, sub-QCs, QQs, and the QRs for being built in the software product.

7. A requirement identification system comprising:
   a processor;
   an analysis module coupled to the processor, to,
      receive input data from a user, wherein the input data is associated with development of a software product and is indicative of one of objectives to be met by the software product being developed and pre-defined quality requirements of an existing software product;
      retrieve a pre-defined product quality requirement model (FORM) from a database, wherein the FORM comprises of a taxonomy tree that defines,
         a primary level comprising a plurality of quality characteristics (QCs) configured to define attributes for being developed in the software product,
         a secondary level configured to define a plurality of sub-QCs for each QC of the primary level,
         a tertiary level configured to identify a plurality of quality objectives (QOs) based on each of the sub-QC of the secondary level, wherein the each of the plurality of QOs define a capability associated with the sub-QC for being built in the software product, and
         a plurality of quality requirements (QRs) for being elicited in the software product and wherein the mapping comprises comparing the input data with each of the plurality of QCs to map the input data with the pre-defined FORM; and
      identify one of at least one QR from the plurality of QRs applicable for the software product and at least one gap in the quality requirements of the existing software product, based on the comparison; and
   a generation module, coupled to the processor, to generate a report for the software product based on the identification.

8. The requirement identification system of claim 7, wherein the analysis module is further configured to,
   select at least one QC from the plurality of QCs for being developed in the software product, wherein the selection is based on the comparison of the input data with the FORM;
   determine at least one sub-QC from the plurality of sub-QCs for the at least one selected QC;
   identify at least one QO from the plurality of QOs for eliciting the QRs of the software product, wherein the identification is based on the at least one determined sub-QC and wherein each of the plurality of QOs defines a capability associated with the sub-QC for being built in the software product.

9. The requirement identification system of claim 7, wherein the analysis module further modifies the at least one identified QR based on the input data specific to the software product.

10. A non-transitory computer-readable medium having embodied thereon a computer program for executing a method for identifying quality requirements of a software product before development of the software product, the method comprising:
   receiving, by a processor, input data from a user, wherein the input data is indicative of one of objectives to be met by the software product being developed and pre-defined quality requirements of an existing software product;
   mapping, by the processor, the input data with a pre-defined product quality requirement model (FORM), wherein the FORM is retrieved from a database and comprises of a taxonomy tree that defines,
 a primary level containing a plurality of quality characteristics (QCs) configured to define attributes for being developed in the software product,
 a secondary level configured to define a plurality of sub-QCs for each QC of the primary level,
 a tertiary level configured to identify a plurality of quality objectives (QOs) based on each of the sub-QC of the secondary level, wherein the each of the plurality of QOs define a capability associated with the sub-QC for being built in the software product, and
 a plurality of quality objectives (QOs) for being elicited in the software product and wherein the mapping comprises comparing the input data with each of the plurality of QCs;
identifying, by the processor, one of at least one QO from the plurality of QOs applicable for the software product and at least one gap in the quality requirements of the existing software product, wherein the identification is based on the mapping of the input data with the FORM; and
generating, by the processor, a report for the software product based on the identification.

11. The non-transitory computer-readable medium of claim 10, wherein the PQRM comprises a plurality of quality requirements (QRs) for the software product and wherein the plurality of QRs is associated with the at least one QO.

12. The non-transitory computer-readable medium of claim 10, wherein the identifying the at least one QO comprises:
 selecting at least one QC from the plurality of QCs for the software product, wherein the selection is based on the input data; and
 determining at least one sub-QC from the plurality of sub-QCs for the at least one selected QC for identifying the QOs of the software product.

13. The non-transitory computer-readable medium of claim 10, wherein the identifying the at least one gap in the quality requirements of the existing software product comprises comparing the quality requirements defined for the existing software product with the quality requirements of the pre-defined PQRM.

* * * * *